United States Patent [19]

Kaplan

[11] 4,268,825

[45] May 19, 1981

[54] SYSTEM FOR MONITORING THE MOVEMENT OF OBJECTS PARTICULARLY THE FEEDING OF SEEDS

[75] Inventor: Dov Kaplan, Doar Na Emek Hayarden, Israel

[73] Assignee: Dickey-john Corporation, Auburn, Ill.

[21] Appl. No.: 440,200

[22] Filed: Feb. 6, 1974

[51] Int. Cl.³ .............................................. G08B 21/00
[52] U.S. Cl. .................................. 340/684; 340/518; 340/674
[58] Field of Search ................ 340/236, 259, 267 R, 340/518, 521, 522, 671, 674, 684

[56] References Cited

U.S. PATENT DOCUMENTS

| | | | |
|---|---|---|---|
| 2,371,192 | 3/1945 | Short | 340/236 |
| 2,659,881 | 11/1953 | Bogot et al. | 340/267 R |
| 3,527,928 | 9/1970 | Ryder et al. | 340/267 R |
| 3,551,672 | 12/1970 | Homer et al. | 340/236 R X |
| 3,704,459 | 11/1972 | Young | 340/267 R |
| 3,723,989 | 3/1973 | Fathauer et al. | 340/259 |
| 3,739,367 | 6/1973 | Fathauer | 340/267 R |

*Primary Examiner*—David L. Trafton
*Attorney, Agent, or Firm*—Trexler, Wolters, Bushnell & Fosse, Ltd.

[57] ABSTRACT

A system for monitoring the movement of objects through a predetermined path comprises a sensor producing electrical signals by the movement of the objects through the path, a measuring circuit producing a measurement of the rate at which the objects move through the path, presetting means for presetting a predetermined minimum rate, and an indicator indicating when the measured rate is below the preset predetermined minimum rate. The invention is described as embodied in a seed monitor attached to colter plough blades for monitoring the rate of feeding of the seeds. Also describes is an adapter unit which enables the number of sensors to be multiplied by time-sharing each measuring circuit with a plurality of sensors.

9 Claims, 6 Drawing Figures

SYSTEM FOR MONITORING THE MOVEMENT OF OBJECTS PARTICULARLY THE FEEDING OF SEEDS

BACKGROUND OF THE INVENTION

The present invention relates to systems for monitoring the movement of objects through a predetermined path. The invention is particularly suited, and is therefore described below, for use in monitoring the rate of feed of a seed feeding device for assuring that the seeds are fed according to a predetermined minimum rate.

Seed planters usually include a plurality of seed feeding devices, one for each row being planted. Such planters are frequently used for seeding corn, soya beans, cotton, beets and the like. The yield of these and other crops can be increased by assuring that each row of the planter is continuously working, and that each row is dropping the seeds according to a predetermined minimum rate.

One type of seed monitoring system heretofore used includes mechanical switches which are actuated as a result of physical contact with the seeds, an example of such a system being described in U.S. Pat. No. 2,907,015. Other seed sensing devices have also been used, such as optical sensors as described in U.S. Pat. No. 3,537,091.

In the foregoing types of systems, the indicator is usually in the form of a lamp which is flashed each time a seed is sensed. This means that the operator must continuously watch the lamp and its rate of flashing to see whether the seeds are being fed and at what rate. Such arrangements, however, are very awkward to monitor particularly when a large number of rows of seeds are being planted simultaneously, since the tractor driver must, among his other functions, continuously watch all the lamps to make sure they are flashing at the proper rate.

BRIEF SUMMARY OF THE INVENTION

The present invention provides a system which can be much more easily monitored by the operator, particularly when a large number of rows are being planted at one time.

According to the present invention, there is provided a system for monitoring the movement of objects through a predetermined path, particularly the feeding of seeds, comprising: a sensor sensing the movement of the objects through the predetermined path and producing electrical signals in response thereto; a measuring circuit receiving the electrical signals and producing therefrom a measurement of the rate at which the objects move through the path; presetting means for presetting a predetermined minimum rate; and an indicator indicating when the measured rate of the objects is below the preset predetermined minimum rate.

The indicator may be a lamp energized when the sensed feed rate is below the minimum preset rate. Thus, the operator need merely glance at the indicator in order to determine whether corrective action should be taken. This relieves the operator of a substantial monitoring burden particularly when planting a large number of rows at one time, and better enables him to assure that all the rows will be planted with seeds at or above the preset minimum feed rate.

According to another feature of the invention, the measuring circuit includes a capacitor, a charge-control circuit therefor producing a charge on the capacitor corresponding to the rate at which the objects (seeds) move through the path, and an electronic switch controlled by the charge on the capacitor. The capacitor charge control circuit comprises a source of current charging the capacitor, a one-shot multivibrator which is actuated upon the sensing of each object (seed) as it moves through the path, and a steering circuit for steering the charging current away from the capacitor during each actuation of the multivibrator. The capacitor charging current is variable by the presetting means for presetting the predetermined minimum rate.

In the preferred embodiment of the invention described below, the sensor comprises a light source and a light-sensitive device in the path of movement of the objects (seeds).

According to another feature of the invention, there is provided the foregoing monitoring system in combination with a colter plough blade formed with an opening, the sensor being supported by the colter blade with the light source on one side of the opening and the light sensitive device on the opposite side of the opening, a seed feeder being supported over the colter blade opening for feeding seeds therethrough past the sensor to the ground.

As pointed out earlier, the invention is particularly advantageous in applications involving a plurality of seed feeders, each having a sensor and an indicator.

The system described below further includes an alarm which is actuated when any one of the sensors senses a rate of seed feed which is below its respective minimum feed rate. According to another feature, the system further includes means automatically disabling the alarm when all the sensors sense a rate of feed below their respective minimum feed rates, so that the alarm will not be sounded when all the feeders are inoperative, such as when the plough is turning around or traversing sections not to be seeded.

According to a still further feature, the invention provides an arrangement wherein each measuring circuit may be used to accommodate a plurality of sensors. Thus, if in the basic system there are four sensors for planting four rows with each sensor including a measuring circuit, the use of the adapter unit enables each measuring circuit to accommodate a number of sensors. This greatly increases the capacity and flexibility of the system. Each measuring circuit is time-shared with its respective group of sensors, the adapter unit including sequencing means sequentially connecting each in its group of sensors to the measuring circuit for predetermined time periods. The sequencing means is interrupted upon the failure of a sensor to detect a predetermined number of seeds during any one time period, thereby providing an indication of when and where the seeds are not being fed at the proper minimum rate.

Further features and advantages of the invention will be apparent from the description below.

BRIEF DESCRIPTION OF THE DRAWINGS

The invention is herein described, by way of example only, as embodied in a seed monitoring system for use with a multi-row planter. In the drawings.

DESCRIPTION OF THE PREFERRED EMBODIMENT

Figure 1:
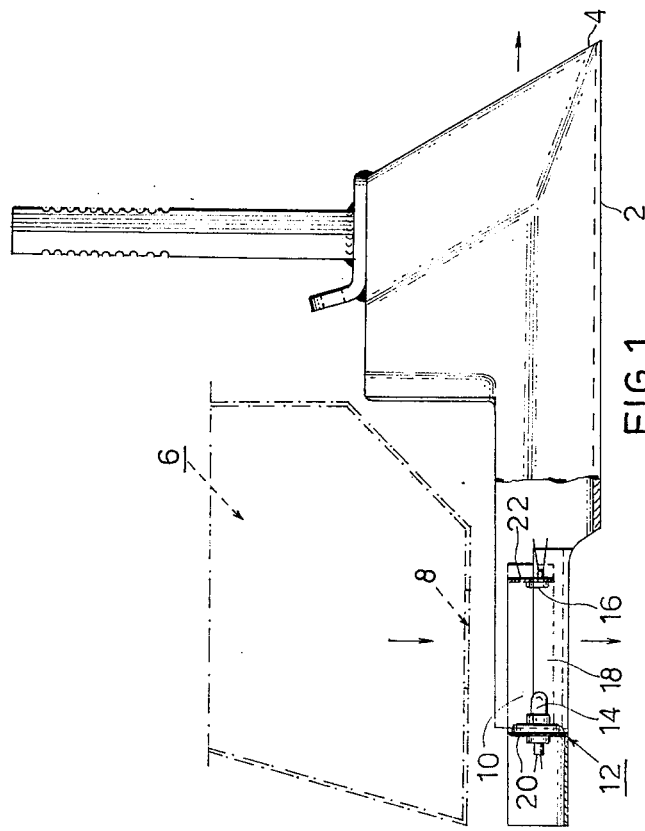
FIG. 1 is a side elevational view of a colter plough blade incorporating a seed sensor in accordance with the present invention.

In FIG. 1, there is shown a single colter plough blade 2, the forward end 4 of which is pointed for making vertical cuts in the soil as the blade is pulled there along by a tractor. The seed feeding device, generally designated 6, is supported over the colter blade 2, and dispenses seeds through an opening 8 in the feeder. The colter blade 2 is formed with an opening 10 in line with the outlet opening 8 of the feeder 6, the seeds freely falling through opening 10 to the ground.

Figure 2:
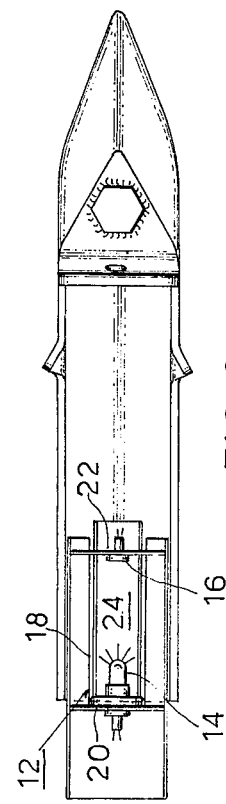
FIG. 2 is a top plan view of the colter blade including the seed sensor.

A seed sensor, generally designated 12, is mounted on the colter blade 2 within its opening 10. Sensor 12 is of the optical type, and includes a light source 14 on one side of opening 10, and a light-sensitive device (such as a photo-transistor) 16 on the other side of the opening. Both the light source and photo-transistor are supported by a holder 18 made of sheet metal or the like. Holder 18 is preferably of rectangular shape in plan, as shown in FIG. 2, substantially conforming to the shape of opening 10 in colter blade 2. The holder is formed with a ledge 20 adjacent to one end for mounting lamp 14, and with a second ledge 22 at its opposite end for mounting the photo-transistor 16. The holder is further formed with a rectangular cut-out 24 extending between lamp 14 and photo-transistor 16, this cut-out being aligned with outlet opening 8 of the seed feeder.

As the seeds are fed by feeder 6 through its outlet opening 8, they freely fall through opening 24 of the sensor, the movement of the seeds through this path being sensed by lamp 14 and photo-transistor 16.

Figure 6:
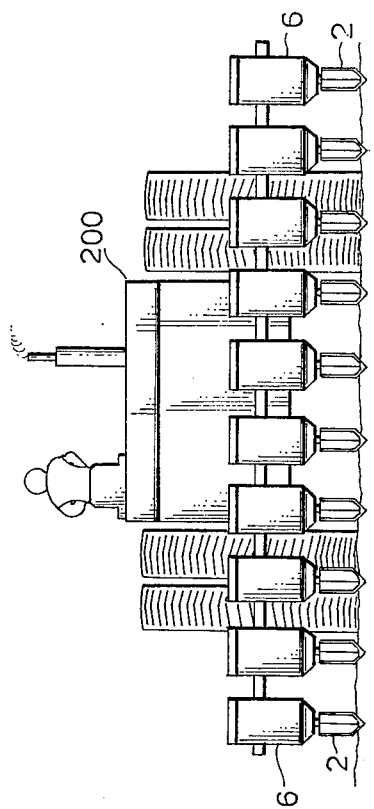
FIG. 6 is a rear elevational view illustrating a multi-row planter including the seed monitoring system of the present invention.
Figure 4:
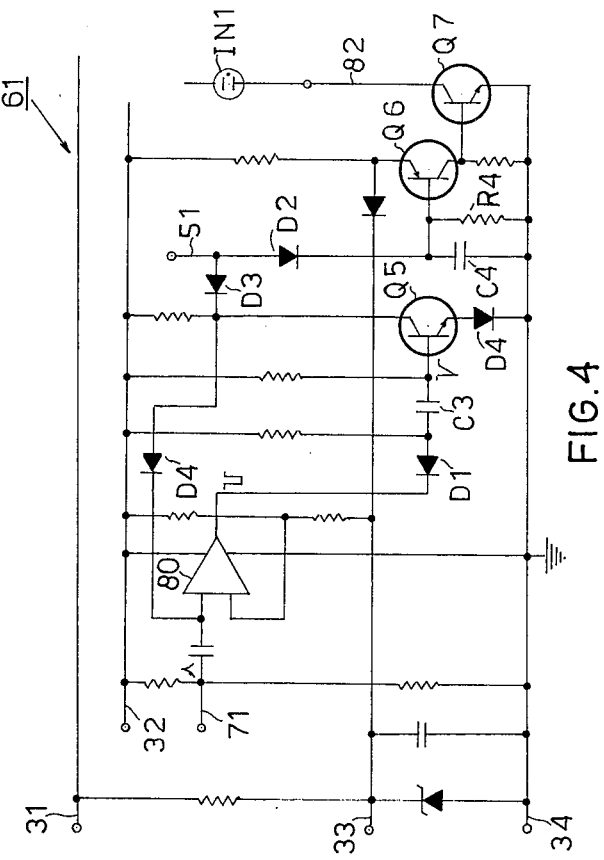
FIG. 4 is a diagram of the measuring system used in the circuit of FIG. 3.
Figure 3:
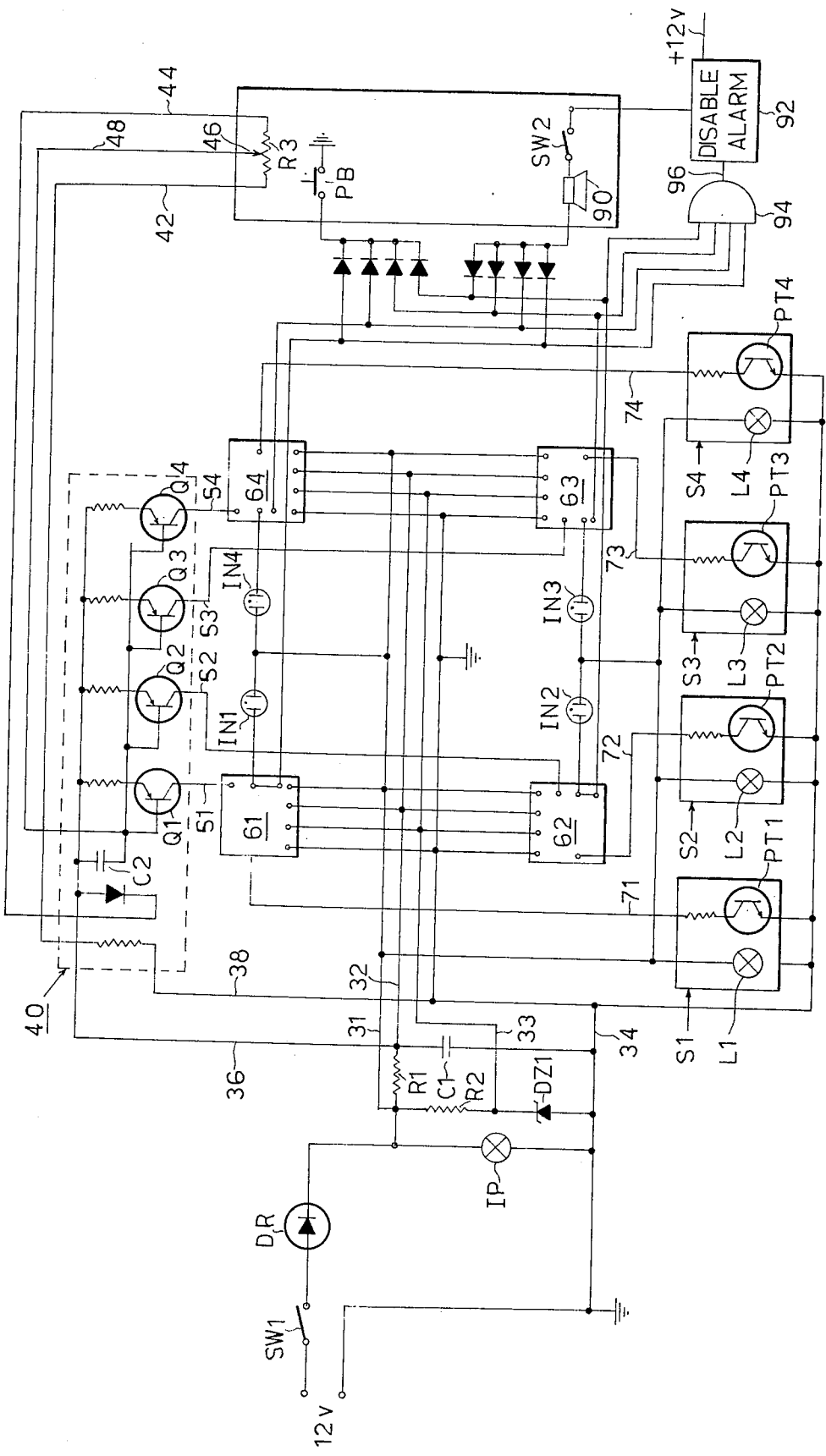
FIG. 3 is a diagram of the overall electrical circuit of the monitoring system used in the arrangement of FIGS. 1 and 2.

FIGS. 1 and 2 illustrate only one seed feeder, colter plough blade, and sensor, but it will be appreciated that in most applications a plurality of such feeders, blades and sensors will be used in order to plant a plurality of rows at one time. FIGS. 3 and 4 illustrate a system utilizing four sensors, and FIG. 5 illustrates an adapter unit which may be used to accommodate an even larger number of sensors, such as 10 or more, as illustrated in FIG. 6.

Figure 5:
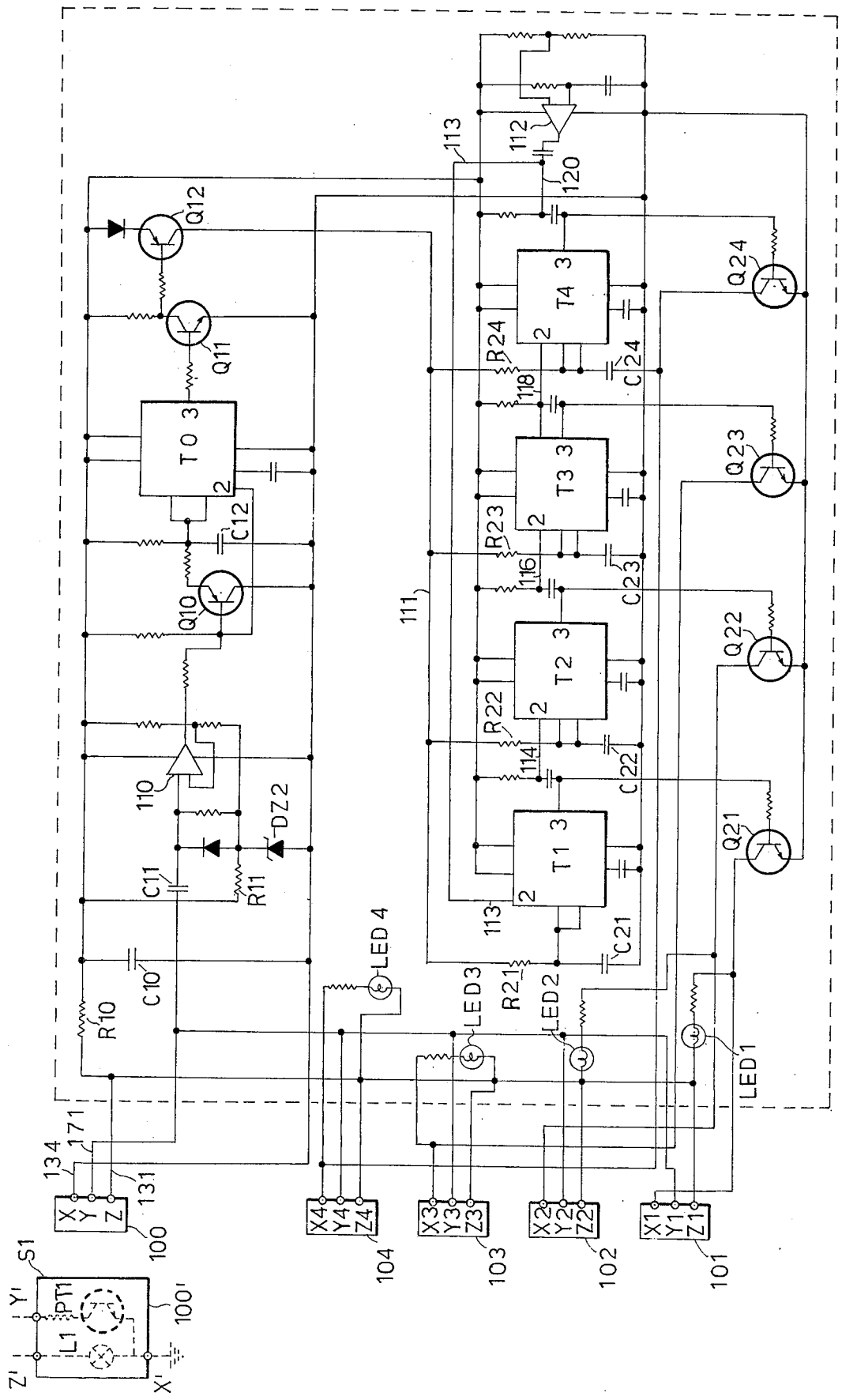
FIG. 5 is a diagram illustrating the circuit of the adapter unit which may be used for accommodating a larger number of seed sensors.

As one practical example, the overall arrangement illustrated in FIGS. 3 and 4 may be used for six sensors, and by the use of the adapter unit illustrated in FIG. 5, each one of the six sensor channels may be used, in turn, to accommodate six sensors, thereby providing a capacity of up to 36 sensors. This will be described more fully below.

FIG. 3 illustrates the overall electrical circuit utilizing four sensor channels. Each sensor channel includes a rate measuring circuit shown in block form in FIG. 3 and illustrated more particularly in FIG. 4.

The circuit of FIG. 3 is supplied from a battery, such as the 12 volt battery of the tractor, via a main switch SW1 and a diode rectifier DR. An indicator lamp IP is connected across the line to indicate when power is on.

Also connected across the power supply is a resistor R2 and a Zener diode DZ1 which, together with a smoothing network R1, C1, provide +12 volts on conductor 31, a smoothed +12 volts on conductor 32, and a +5.1 volts on conductor 33, while conductor 34 is grounded.

The voltage between conductors 32 and 34 is applied, via conductors 36, 38, to a rate presetting circuit, generally designated 40. Circuit 40 is used to preset a predetermined minimum feed rate at which the feeders 6 are to dispense the seeds to the ground. For presetting circuit 40, a resistor R3 supplied with 12 volts via conductors 42, 44, is engaged by a movable tap 46 to provide a variable voltage, via conductors 48, 44, to the rate preset circuit 40.

Rate preset circuit 40 includes four transistors Q1–Q4, the bases of which are controlled by a capacitor C2 whose charge is determined by the setting of variable tap 46. The collectors of the four transistors Q1–Q4 are connected to respective output conductors 51–54, each conductor leading to a rate measuring circuit 61–64, there being one for each of the seed feeders 6 used in the planter. As indicated earlier, four such seed feeders are used in the examples of FIG. 3, but this may be a larger or smaller number.

The system further includes four sensors S1–S4, one for each of the seed feeders. Each of the sensors S1–S4 thus corresponds to the sensor generally designated 12 in FIGS. 1 and 2 which is mounted, in the example illustrated, within the opening 10 of the respective colter plough blade 2. Each sensor includes a lamp (L1–L4) corresponding to lamp 14 in FIGS. 1 and 2, and a light-sensitive device, namely a photo-transistor (PT1–PT4), corresponding to light-sensitive device 16 in FIGS. 1 and 2. Thus, the passage of a seed through the colter blade from each feeder is sensed by the interruption of the light from the respective lamp (L1–L4) impinging on the respective photo-transistor (PT1–PT4), thereby producing an electrical signal from the photo-transistor of the respective sensor.

The electrical signals from the four sensors are fed via conductors 71–74 to their respective measuring circuits 61–64.

FIG. 4 illustrates the rate measuring circuit 61 for sensor S1, the measuring circuits 62–64 for the other sensors S2–S4 being the same.

As shown in FIG. 4, the signal from the photo-transistor PT1 is applied via conductor 71 to amplifier 80, the output from the amplifier being applied via diode D1 and capacitor C3 to the base of transistor Q5.

The current from the rate preset circuit 40 is applied via conductor 51 and diode D2 to charge capacitor C4. The latter capacitor is tied to the base of transistor Q6, and the collector of transistor Q6 is tied to the base of transistor Q7. The output of the latter transistor is fed via conductor 82 to indicator lamp IN1.

Amplifier 80, capacitor C3, and transistor Q5 form a one-shot multivibrator. As a seed is dropped through its colter blade 2, the light to the respective photo transistor PT1 is interrupted, and a positive voltage pulse is generated on conductor 71. The one-shot circuit is triggered on the amplified portion of the leading edge of the pulse caused by the light "shading" of the falling seed. It is triggered in micro-seconds so it is essentially insensitive to the speed of the falling seed. The output of the one-shot also supplies positive feedback via diode D4 to pulse amplifier 80 of a constant pulse width, e.g. 20 milliseconds, which determines the period of the trigger action. When the one-shot circuit completes its action, transistor Q5 is driven back to saturation and the circuit is ready for subsequent triggers.

Thus, transistor Q5 is conducting whenever no seeds are sensed and is cut-off whenever a seed is sensed by its respective sensor. When Q5 is cut-off, the current on line 51 from the rate preset circuit 40 is applied to capacitor C4 via diode D2 charging the capacitor. When Q5 is conducting (no seeds being sensed), the current on conductor 51 is steered by diode D3 through transistor Q5, and capacitor C4 is discharged through resistor R4.

Hence, the charge on capacitor C4 is proportional to the rate of feed of seeds through the respective colter blade 2.

When the rate of feed of seeds exceeds the preset level, the ratio of charge to discharge time of capacitor C4 is high, and the capacitor voltage is sufficiently high to bias transistor Q6 to cut-off, which thereby biases transistor Q7 to cut-off. Indicator lamp IN1 thus is non-energized. If the rate of feed of seeds decreases below the preset level, the average voltage on capacitor C4 will decrease, and transistors Q6 and Q7 will be driven into conduction. Transistor Q7 will then energize indicator lamp IN1.

The rate of feed of the seeds is preset by tap 46 of variable resistor R3, which controls the amount of current supplied via conductors 51-54 to capacitor C4 of the respective rate measuring circuit 61-64. Thus, once the operator has preset tap 46 according to the desired minimum rate of feed, he only needs to observe indicator lamps IN1-IN4. If any one becomes energized, this informs him that the rate of feed of the seeds from the respective feeder 6 is below the predetermined rate. The operator can then make the required adjustment or take the appropriate corrective action with respect to that feeder.

The system of FIG. 3 also includes an alarm unit 90, such as a buzzer, which is energized when any one of the indicator lamps IN1-IN4 is energized. Alarm 90 may be disabled by manual switch SW2. Further, a push-button switch PB may be provided to test the system.

FIG. 3 also illustrates a control device 92 which automatically disables alarm 90 when the indicator lamps IN1-IN4 of all the sensors are energized, that is, when all the sensors detect a seed feeding rate less than the predetermined one. This may be effected by providing an AND-gate 94 having an input supplied with a voltage across each of the indicator lamps IN1-IN4, so that when all are energized, an output is produced on line 96 to the Disable Alarm circuit 92. The latter may be a conventional switching transistor whose emitter-collector circuit is in series with alarm 90.

The foregoing circuit 92, which automatically disables alarm 90, relieves the operator of having to manually disable it (by switch SW2) whenever the planter is to traverse ground that is not to be seeded, for example when turning around.

While FIG. 3 illustrates an arrangement including four sensors S1-S4, it will be appreciated that additional sensors can be added by providing a separate measuring circuit (61-64) for each sensor. FIG. 5, however, illustrates an arrangement wherein the number of sensors can be greatly multiplied without adding additional rate measuring circuits, but by time-sharing a group of sensors with one or more of the rate measuring circuits illustrated in FIG. 3.

The circuit of FIG. 5 is embodied in an adapter unit which may be used for any one or all of the sensors S1-S4 in order to have the rate measuring circuit of the respective sensor of the basic FIG. 3 circuit accommodate a plurality of sensors, rather than a single sensor. In the adapter unit of FIG. 5, each rate measuring circuit can accommodate four sensors, so that the capacity of the basic circuit of FIG. 3 can be multiplied from four sensors to sixteen sensors. Such an adapter unit is particularly useful in planting garden vegetables where a large number of rows are planted at one time.

The adapter unit of FIG. 5 is constructed as a separate unit having a plug 100 carrying three terminals X, Y, Z, pluggable into a socket carrying corresponding terminals X', Y', Z' in which the basic sensor (e.g. S1) is also pluggable. The adapter unit includes four sockets (101-104), one for each sensor which it is to accommodate, each socket including three terminals (X1-X4, Y1-Y4, Z1-Z4) corresponding to terminals X, Y, and Z of plug 100.

While FIG. 5 illustrates the adapter unit as being pluggable into the system in lieu of sensor S1, and as containing four sockets for accommodating four added-on sensors, it will be appreciated that such a unit could be used with respect to all the sensors S1-S4 of the basic circuit of FIG. 3, and that each adapter unit could accommodate a larger or smaller number of added-on sensors. A very flexible arrangement is thus provided in which the basic system may be expanded as and when required in order to accommodate the appropriate number of sensors for any particular planting operation.

In the adapter unit of FIG. 5, its conductor 131 is connected via terminal Z to conductor 31 of the basic system of FIG. 3, and therefore carries +12 volts; conductor 134 is connected via terminal X to conductor 34 of the basic system and thereby to ground; and conductor 171 is connected via terminal Y to conductor 71 of the basic system and therefore receives the input to the respective rate measuring circuit 61.

Conductor 131 is connected to the corresponding Z-terminal in each of the four sockets 101-104 for connection to the lamp of the respective added-on sensor; and conductor 171 is connected to the corresponding Y-terminal in the four sockets 101-104 for connection to the photo-transistor of the respective added-on sensor.

The +12 volts between conductors 131 and 134 is smoothed by filter R10, C10, and is then applied across amplifier 110. The bias voltage (e.g. 5.1 v) for the amplifier is supplied by resistor R11 and Zener diode DZ2. The input to amplifier 110 is supplied by conductor 171 via capacitor C11. As will be recalled, conductor 171 is connected to the output of all the photo-transistors in the added-on sensors.

The output from amplifier 110 is applied to the base of a transistor Q10 whose emitter-collector circuit is connected across a capacitor C12. Capacitor C12 is normally charged by the +12 volt source, but is discharged each time transistor Q10 is rendered conductive by a seed being sensed.

Capacitor C12 controls a timer T0 set to time-out at a predetermined time interval (e.g. 330 ms) unless capacitor C12 has meanwhile discharged. Thus, if the seeds are detected at a rate, (e.g. 3 seeds per second) at least equalling the predetermined minimum rate, timer T0 never times-out.

The output of timer T0 is connected to the base of transistor Q11 whose emitter is coupled to the base of transistor Q12, the arrangement being such that transistor Q12 conducts all the while the timer T0 has not run-out, but ceases to conduct if and when the timer does run-out.

While transistor Q12 conducts, (indicating that seeds are being detected at the minimum predetermined rate), charging current is supplied to capacitor C21 via resistor R21 and conductor 111. Capacitor C21 controls another timer T1 which is set to time-out after the elapse of a predetermined time period greater than the time-out period of timer T0. Timer T1 however, will time-out only so long as capacitor C21 is being charged by transistor Q12 so that if transistor Q12 ceases to conduct, indicating a seed detecting rate less than the predetermined minimum, timer T1 will not run-out.

The output of timer T1 is applied to the base of a transistor Q21 whose emitter collector circuit is connected in series with conductor 134 connected to the X-terminal of socket 101 for the first added-on sensor. As will be recalled, conductor 134 is connected, via the X-terminal of the socket, to the ground X'-terminal of the basic system.

Thus, the ground connection of the first added-on sensor (plugged into socket 101) is completed, thereby enabling the sensor whenever transistor Q21 is rendered conductive.

Similar timers and transistors are provided for the other three added-on sensors, timer T2 controlling transistor Q22 for enabling the second added-on sensor plugged into socket 102, timer T3 controlling transistor Q23 for enabling the third added-on sensor plugged into socket 103, and timer T4 controlling transistor Q24 for enabling the fourth added-on sensor plugged into socket 104. The three timers T2, T3, and T4 also include capacitors (C22, C23, C24) charged during the conduction of transistor Q12 via resistors R22, R23, R24, and are set to time-out in the same manner, and after the elapse of the same time interval, as timer T1.

Timers T1–T4, as well as timer T0, may all be in the form of integrated circuit modules, for example NE555. The trigger input in this module is terminal "2," and the output is terminal "3." For the sake of simplifying the drawings, only these terminal numbers are illustrated. Also, the various biasses to these modules are not identified in the drawings by reference numerals or described herein, as this information is readily available in the trade literature.

Timer T1 is triggered by the output of amplifier 112 via line 113, and as soon as its time runs out, it in turn triggers the next timer T2 via line 114. In a similar manner, timer T2 triggers timer T3 via line 116, and timer T3 triggers timer T4 via line 118. The output of timer T4 is connected via conductor 120 to line 113, so that when timer T4 times out, it in turn retriggers timer T1 to start a new cycle.

The adapter unit illustrated in FIG. 5 operates in the following manner:

Assuming the unit is to be used for adding on four sensors, its plug 100 would be plugged into socket terminals X', Y', Z' of the overall system, in lieu of sensor S1, and the four added-on sensors would be plugged into the four sockets 101–104. The four added-on sensors would thus use, in a time-sharing manner described below, the rate measuring circuit 61 provided for sensor S1 of the basic system of FIG. 3.

As soon as power is turned on, amplifier 112 feeds a trigger pulse via line 113 to timer T1, which starts that timer. Timer T1 turns-on transistor Q21. This enables the first added-on sensor by completing its circuit to ground via conductor 134 of the adapter unit connected to conductor 34 of the basic system. The first sensor is thus enabled, and the seeds detected by its photo-transistor are represented by signals fed, via conductor 171 of the adapter unit and conductor 71 of the basic system, to the rate measuring circuit 61.

After timer T1 times-out, transistor Q21 is extinguished, thereby disabling the first added on sensor; in addition, timer T2 is triggered via conductor 114 to render transistor Q22 conductive, and thereby to enable the second added-on sensor. When timer T2 times-out, its transistor Q22 is extinguished, and the next timer T3 is triggered via conductor 116 to cause transistor Q23 to conduct, thereby enabling the third added-on sensor. When timer T3 times-out, its transistor Q23 is extinguished and the next timer T4 is triggered via conductor 118 to cause its transistor Q24 to conduct, and thereby to enable the fourth added-on sensor. As soon as timer T4 times-out, timer T1 is retriggered via line 120 to start a new cycle of sequentially connecting the added-on sensors to measuring circuit 61.

An indicator is provided for each of the added-on sensors to indicate when each is enabled. In FIG. 5, these indicators are represented by light-emitting-diodes LED1–LED4 connected across the +12 volt conductor 131 and collector of the respective transistor Q21–Q24 of the four added-on sensors. Each LED is energized when its respective sensor is enabled, so that the specific added-on sensor active at any instant will be indicated by the LED energized.

The timers T1–T4 sequentially enable the added-on sensors, in the manner described above, provided that their respective capacitors C21–C24 are being charged by the charging current supplied via line 111 by the conduction of transistor Q12. Transistor Q12, however, will be conductive only so long as timer T0 does not time-out.

As will be recalled, timer T0 is set to time-out in about 330 ms (when the minimum feed rate is 3 seeds per second) unless its capacitor C12 is discharged before the expiration of this time interval. Capacitor C12 in turn is discharged by the triggering of transistor Q10 each time a seed is detected by the respective sensor. Thus, if more than 3 seeds per second (where this is the predetermined minimum rate) are being sensed, timer T0 never runs out. Accordingly, transistor Q12 is continuously conductive, thereby continuously charging capacitors C21–C24, and enabling timers T1–T4 to sequentially connect the added-on sensors to measuring circuit 61.

Now should the rate of detection of the seeds be less than 3 per second, timer T0 will run out before its capacitor C12 is discharged, whereupon transistor Q12 will cease to conduct, thereby terminating the charging current to capacitors C21–C24 of timers T1–T4. At that instant, one of the timers T1–T4 will be in operation, and its transistor Q21–Q24 will be conducting to enable the respective added-on sensor. The sequential advancing of the timers will be terminated, so that the added-on sensor which is enabled at that instant, will remain enabled. The enabled sensor can be identified by the light-emitting-diode (LED1–4) energized. Thus the defectively operating seed feeder can be identified.

The operator may then take the appropriate corrective action to resume the minimum rate of feed of the seeds for that particular row, whereupon the system will also resume its monitoring operation.

An adapter unit such as illustrated in FIG. 5 can thus be used to enable each one of the four measuring circuits 61–64 of the basic system of FIG. 3 to accommodate a plurality of added-on sensors whenever it is desired to use the feed monitoring system for planting a larger number of rows.

FIG. 6, for example, illustrates a planter arrangement driven by a tractor 200 for planting ten rows, each row including a colter plough blade 2 containing a feed monitoring sensor for monitoring the rate of feed of seeds from a seed feeder 6, all as illustrated in FIGS. 1 and 2. Where ten rows are to be planted, the system illustrated in the drawings would include two of the adapter units illustrated in FIG. 5, each for accommodating four added-on sensors for time-sharing two of the measuring circuits. The two other measuring circuits would not be time-shared, but would be each controlled only by a single sensor. In this manner, the system can accommodate up to 16 sensors for enabling 16 rows to be simultaneously planted, with each row being monitored by its own sensor.

A preferred commercial form would be one in which the basic system includes six basic sensors and six measuring circuits, with up to six adapter units each accommodating six added-on sensors, thereby enabling the system to be used for simultaneously planting up to 36 rows with each row being monitored by its own sensor.

While the system has been described particularly with reference to seed planters, and also with respect to the use of optical sensors, it will be appreciated that it, or various features thereof, could advantageously be used in other applications and with other sensors.

Further variations, modifications, and applications of the illustrated embodiment will be apparent.

What is claimed is:

1. A system for monitoring the movement of objects, particularly seeds, through a plurality of predetermined paths, comprising: a plurality of sensors each sensing the movement of an object through one of the paths and producing electrical signals in response thereto; a measuring circuit receiving said electrical signals and producing therefrom a measurement of the rate at which the objects move through the paths, sequencing means automatically connecting the rate measuring circuit sequentially to the plurality of sensors for predetermined time periods, an indicator for each sensor indicating when the measured rate of the objects in the respective path varies from a predetermined limit, and means automatically interrupting the further sequencing of the sequencing means upon failure of a sensor to detect a predetermined number of objects in its respective path during any of said time periods.

2. A system as defined in claim 1, wherein there are a plurality of measuring circuits each adapted to accommodate a plurality of sensors.

3. A system as defined in claim 1, further including presetting means for presetting the measuring circuits for a predetermined minimum rate of the objects, each of said indicators indicating when the measured rate of the objects in the respective path is below the present predetermined minimum rate.

4. A system as defined in claim 1, wherein each of said sensors comprises a light source and a light-sensitive device.

5. A system as defined in claim 4, in combination with a plurality of colter plough blades each formed with an opening, each sensor being supported by a colter blade with the light source on one side of the opening and the light-sensitive device on the opposite side of the opening, and a plurality of seed feeders each supported over a colter blade opening for feeding seeds therethrough past the sensor to the ground.

6. A system for monitoring the feeding of seeds from a feeder through a plurality of paths, comprising: a plurality of sensors each sensing the movement of the seeds through one of the paths and producing electrical signals in response thereto; measuring circuit means receiving the electrical signals and producing therefrom a measurement of the rate of feed of the seeds through each of the paths; presetting means for presetting the measuring circuit means for a predetermined minimum rate of feed in each path; an indicator for each path indicating when the measured rate of feed of the seeds is below the preset predetermined minimum rate in the respective path; an alarm; means for actuating said alarm when any one of the sensors senses a rate of feed of seeds which is below the minimum rate for the respective path; and means disabling said alarm when all said sensors sense a rate of feed of the seeds which is below their respective minimum feed rates.

7. A system as defined in claim 6, in combination with a plurality of colter plough blades each formed with an opening through which the seeds pass, each of said sensors being supported by a colter blade and including a light source on one side of the blade's opening and a light-sensitive device on the opposite side of the opening.

8. A system as defined in claim 7, wherein each sensor includes a holder, means for attaching same to the colter blade, a mounting for the light-sensitive device on one side of the holder, and a mounting for the light source on the other side of the holder, each of said holders being formed with a cut-out between said two mountings to provide a free path of fall for the seeds fed from the feeding device.

9. A system as defined in claim 6, including a plurality of rate measuring circuits, each adapted to accommodate a group of sensors, the system further including sequencing means for each rate measuring circuit sequentially connecting same to each of its group of sensors for predetermined time periods, and means interrupting the sequencing means upon failure of a sensor to detect the movement of a predetermined minimum number of seeds through its respective path during any time period.

* * * * *